Patented Jan. 21, 1930

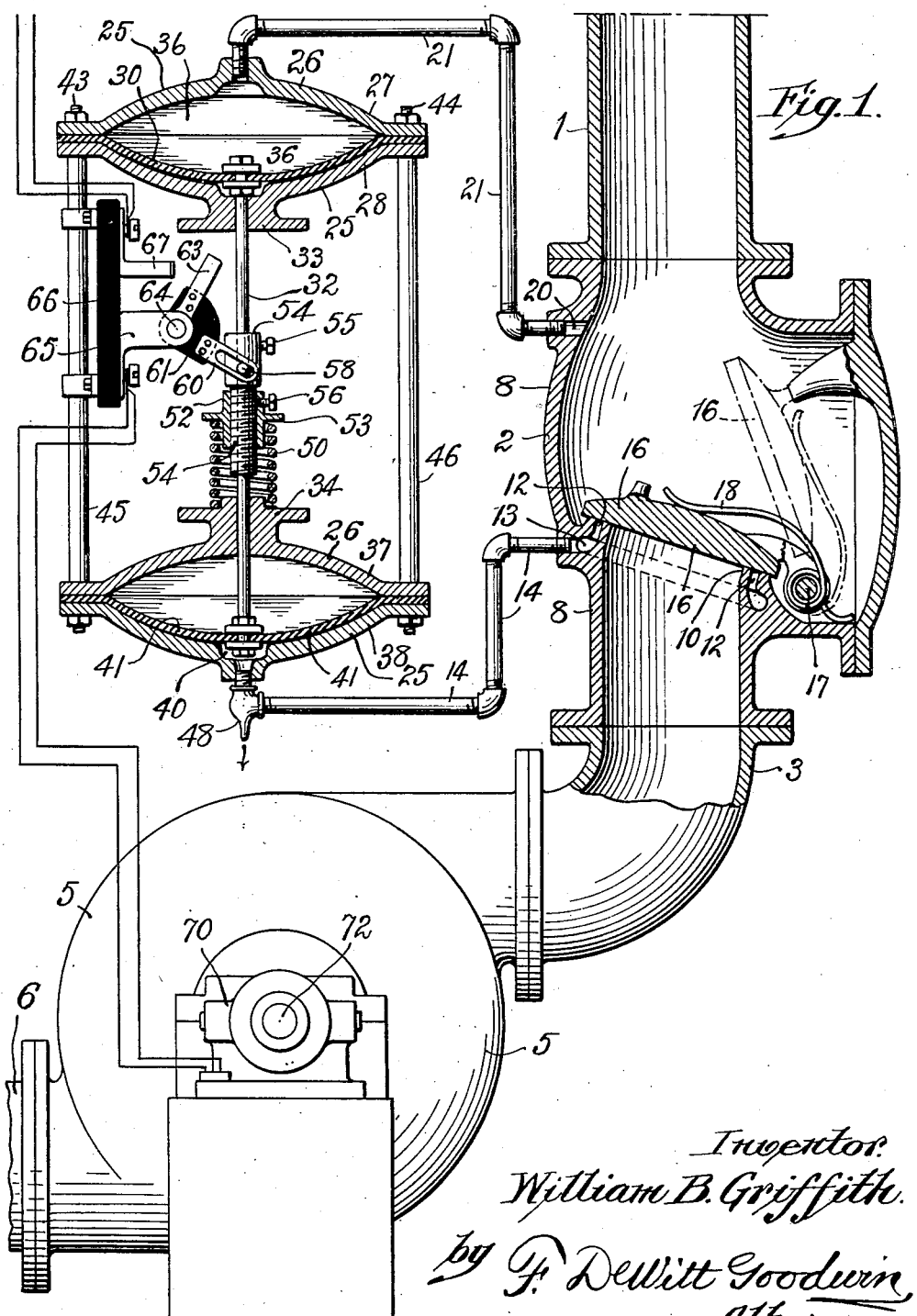

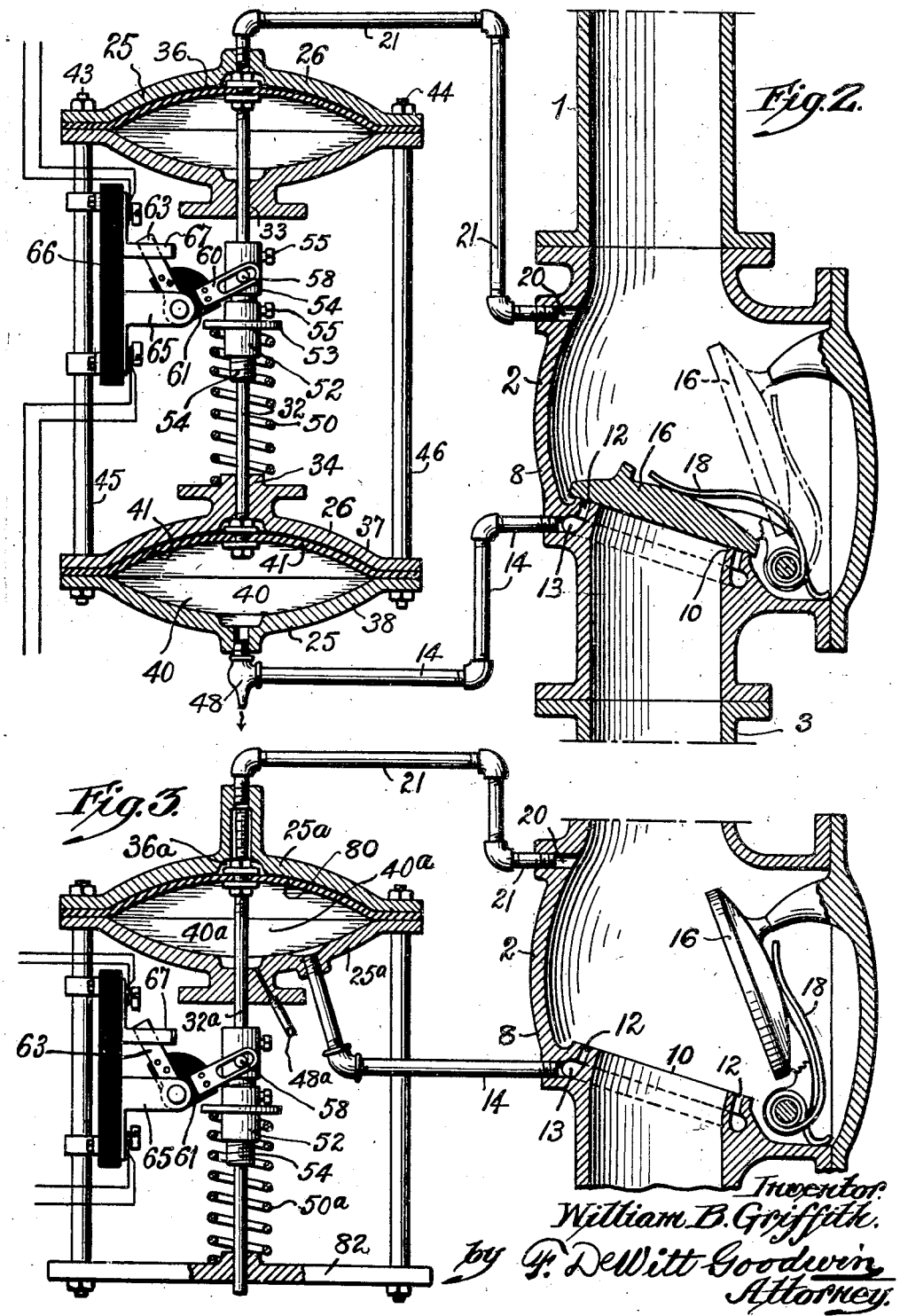

1,744,684

UNITED STATES PATENT OFFICE

WILLIAM B. GRIFFITH, OF AUDUBON, NEW JERSEY, ASSIGNOR TO STAR SPRINKLER CORPORATION, A CORPORATION OF NEW JERSEY

PRESSURE-CONTROL DEVICE

Application filed September 14, 1928. Serial No. 306,061.

My invention relates to a pressure control device, and particularly to a control device adapted for use in connection with pumps for increasing water pressure. The present adaptation of my invention is for use in connection with sprinkler systems for fire protection of high buildings where the city water pressure is not sufficient to force the water to the upper stories of the building. The present practice is to provide a centrifugal pump for increasing the pressure from the source of supply. Such pumps are known as booster pumps and they are controlled by automatic pressure regulators for starting and stopping the pump. In all such installations, at the present time, the stopping of the booster pump is accompanied by water hammer, in varying degrees, which in some instances is so severe that pipe fittings have been broken by the water hammer, caused by the sudden closing of the check valve, which heretofore closed after the pump was stopped at a predetermined high pressure.

The object of my invention is to provide means for preventing water hammer in the system upon the closing of the check valve located in the supply pipe of the system; a further object of my invention is to provide means for controlling the regulator so that it will not stop the booster pump at a predetermined high pressure in the system until after the check valve has been fully closed, thus allowing the check valve to close slowly and without causing any water hammer; a still further object of my invention is to provide a check valve having a cavity formed in the valve seat which is adapted to be closed by the check valve when the clapper is closed upon its seat and by providing a connection between said cavity and a vented chamber associated with the pressure regulator for holding the regulator in a position which will continue the operation of the pump until said cavity is closed by the check valve clapper.

A still further object of my invention is to provide a vent aperture in said last mentioned connection through which the pressure in the vented chamber of the regulator will be slowly reduced after the check valve clapper is closed, and upon the pressure being so reduced in a vented chamber the regulator will operate and stop the pump. These together with various novel features of construction and operation, which will be more fully hereinafter described and claimed constitute my invention.

Referring to the accompanying drawings, Fig. 1 is a vertical sectional view partly in elevation illustrating, diagrammatically, my improved pump governor control device; Fig. 2 is a partial view similar to Fig. 1 showing the parts in a different position, and Fig. 3 is a partial vertical sectional view, showing a modified form of my invention.

In the accompanying drawings in which like reference characters refer to like parts 1 represents a supply pipe, of a water supply system for fire protection of buildings. 2 represents a check valve connected with the pipe 1, which in turn is connected by suitable fittings 3 with a centrifugal booster pump 5, which is connected with an inlet pipe 6 connecting with a source of water supply such as the city water main. Said booster pump 5 may be of any standard type, having a predetermined maximum capacity.

The check valve 2 consists of a casing 8 provided with a valve seat 10 having an annular cavity 12 formed therein, which is in communication with an aperture 13 formed in said casing, adapted for making a pipe connection thereto and to which the pipe 14 is shown connected in the drawings. A clapper 16 is pivotally mounted upon a shaft 17 secured in the casing 8. Said clapper is adapted to close upon the valve seat and close the annular cavity 12 and also move into the open position shown in dotted lines in Figs. 1 and 2 and in full lines in Fig. 3.

A spring 18 is operatively associated with the clapper and so arranged as to move the clapper toward the valve seat 10 and assist in the closing movement of the clapper when the water pressure is nearly equal above and below the valve 2. Said casing 8 is also provided with a connection 20 for a pipe 21 at a point above the valve seat 10.

Said pipe 21 is connected with a regulator 25, and the pipe 14 is also connected with said regulator. The regulator 25, shown in Figs. 1 and 2, consists of a casing 26 formed of sections 27 and 28 between which is secured a diaphragm 30 formed of flexible material. A rod 32 is secured to the central portion of the diaphragm and said rod is slidably mounted and freely movable vertical in guides 33 and 34. A pressure chamber 36 is formed in the regulator 25 between the casing section 27 and the movable member, or diaphragm 30, which is always in communication with the supply pipe 1 through the pipe 21.

The regulator 25 is provided with a second, or vented, chamber 40 formed within the sections 37 and 38 of the casing 25 having a movable member or diaphragm 41 secured between the sections 37 and 38, which latter are held in space relation with the sections 27 and 28 by bolts 43 and 44 and spacing sleeves 45 and 46. The second or vented chamber 40 is in communication, through the pipe 14, with the annular cavity 10 and the pipe 1 when the capper 16 is off its seat. The chamber 40 is provided with a vent fitting 48 through which the pressure from the chamber 40 will be slowly reduced after the clapper closes and shuts off the inlet to the pipe 14.

The lower end of said rod 32 is secured to the diaphragm 41 whereby the rod and the diaphragms 30 and 41 move together. A spring 50 is mounted upon the rod 32 between the lower casing and the collar 52 secured upon said rod and is adapted for lifting the rod and the diaphragms, and normally holding them in the position shown in Figs. 2 and 3. Said collar 52 is in the form of a threaded sleeve which is adjustably mounted upon a threaded portion of a head 54 also adjustably secured upon the rod 32. A flange 53 upon the sleeve 52 is adapted to be engaged by the spring 50 and said flange also provides means for turning the sleeve 52 upon the threaded head 54 for varying the tension of the spring relatively to the rod. Said sleeve 52 and head 54 are provided with set-screws 55 and 56 for securing said parts upon the rod after adjustment has been made.

The head 54 is provided with transverse pins or lugs 58 which are in engagement with a pair of arms 60, only one of which is shown in the drawings, said arms being secured on opposite faces of a body 61, of insulating material. Said body 61 is also provided with a pair of blades 63, pivotally mounted upon a shaft 64 between a pair of bearing plates 65, secured upon a base 66. Said base 66 has secured thereto a pair of contact plates 67, with which the blades 63 make contact and form a switch for controlling an electric circuit for operating a motor 70, through suitable wiring for completing the electric circuit from a source of supply.

The motor 70 is mounted upon a shaft 72 of the centrifugal booster pump 5, for rotating the latter. When the switch is in the position shown in Fig. 1, the circuit is broken by the separation of the arms 63 from the plates 67 and the motor and pump are stopped, and when the switch is in the position shown in Figs. 2 and 3 the circuit is completed through the arms 63 and plates 67 and the motor and pump are in operation.

Fig. 3 illustrates a slightly different construction from that shown in Figs. 1 and 2, in which the pressure chamber 36$^a$ and the vented chamber 40$^a$ are arranged in a single sectional unit of the casing 25$^a$. Said chambers are separated by a diaphragm 80 which is secured to and operates a rod 32$^a$, the lower end of which is guided in a frame 82 against which the spring 50$^a$ acts to move the rod and switch parts to complete the electric circuit and operate the pump as above described. The valve and switch parts are the same in Fig. 3 as in Figs. 1 and 2 and bear the same reference characters.

The operation of my invention is as follows:

The spring 50, or 50$^a$, normally lifts the rod 32, or 32$^a$, and moves the switch blade 63 into the closed position shown in Figs. 2 and 3, causing the motor and booster pump 5 to operate and force the water through the connections and through the check valve 2, filling the pipe 1 to a predetermined pressure according to the capacity of the pump which is so constructed that it will not increase the pressure in the pipe 1 beyond a given point. The valve clapper 16 is moved into the open position by the inflowing water from the pump. When the clapper is open the annular cavity 12 in the valve seat is exposed so that the water pressure passes through the pipe 14 to the vented chambers 40 or 40$^a$ and acts upon the lower surface of the diaphragm 41 or 80. The water pressure also passes through the pipe 21 to the pressure chambers 36 or 36$^a$ and acts upon the surface of the diaphragm 30 or 80, thus equal pressures are presented upon the opposite sides or surfaces of the diaphragms so that the rod will still be held in the raised position by the spring 50 or 50$^a$, and the electric switch will be held in the closed position so that the motor and pump will continue to operate.

When the pressure in pipe 1 has reached a maximum pressure, due to the limited capacity of the pump, the spring 18 will close the clapper 15 of the valve 2, thus insuring the closing of the clapper, should it not close by its own weight. When the clapper is closed upon its seat the entrance to the cavity 12 is sealed by the clapper and communication through the pipe 14 is closed. The pipe 14 is provided with a vent valve 48, or as shown in Fig. 3 the casing 25$^a$ is provided with a small vent aperture 48$^a$ through which the pressure from the pipe 14 and the vented chamber below the lower surface of the diaphragm will be slowly relieved.

When the pressure below the diaphragm is thus relieved the pressure in the pressure chamber above the upper surface of the diaphragm will act upon the latter and move the rod against the action of the spring 50 or 50ᵃ, which movement of the rod will open the switch lever 63 into the position shown in Fig. 1, thus stopping the motor and the pump. This movement of the diaphragm and rod for opening the switch cannot take place until the pressures above and below the valve clapper have approximately equalized and the clapper is closed upon its seat. The closing of the check valve will take place slowly due to its own weight or to the action of the spring, while the pump is still in operation, thus avoiding any water hammer due to the sudden closing of the clapper, therefore my invention entirely eliminates water hammer in systems of this character. When the pressure above the valve clapper is reduced to a predetermined low pressure, the spring 50, or 50ᵃ will move the upper diaphragm against said reduced pressure in the pressure chamber 36, or 36ᵃ, and close the electric switch again, starting the motor and the booster pump, thus recharging of the system to its maximum pressure.

When the system is fully charged the pressure becomes uniform within the supply pipe 1 above and below the valve, thus permitting the clapper to again close and allowing the regulator to stop the pump after the clapper has closed.

My improved pressure controlling device may be used in connection with regulators utilizing steam, or compressed air, as well as electricity in their operating mechanism, and various other changes in the construction of the parts and operation of the same, may be made without departing from my invention.

I claim:

1. A pressure control device, comprising a pressure system including a supply pipe, a valve connected with said pipe, a clapper movably mounted in said valve, a booster pump for increasing the pressure in said pipe, a regulator comprising a casing forming a pressure chamber, a connection between said chamber and said pipe above said valve, a movable member mounted in said casing adapted to be moved in one direction by pressure in said chamber, means operatively associated with said movable member and said pump for stopping and starting the latter, means associated with said movable member for normally holding the parts in a position to operate the pump when the pressure in said chamber is at a predetermined low pressure, said casing having a second chamber formed therein located at the opposite side of said movable member from said first mentioned chamber, a connection between said second chamber and the supply pipe, said clapper adapted for opening communication through said last mentioned connection for admitting pressure to said second chamber for holding the movable member in its normal position for operating the pump, said clapper adapted to close communication with said second chamber through said last mentioned connection when the pressure in the supply pipe is approximately equal on opposite sides of the clapper, and means for slowly venting said second chamber after the clapper has closed communication between the supply pipe and said second chamber.

2. A pressure control device, comprising a pressure system including a supply pipe, a valve connected with said pipe, a clapper movably mounted in said valve, a booster pump for increasing the pressure in said pipe, a regulator comprising a casing forming a sealed chamber, a connection between said chamber and said pipe above said valve, a member movably mounted in said casing adapted to be moved in one direction by pressure in said chamber, means operatively associated with said member and said pump for stopping and starting the latter, a spring for actuating said member when the pressure in said chamber is below a predetermined pressure into a normal position for starting the pump, said casing having a second chamber formed therein located upon the opposite side of the said member from said first mentioned chamber, a second connection between said second chamber and said pipe controlled by said clapper adapted when the clapper is open to admit pressure to the second chamber and equalize the pressures in the opposite chambers permitting the spring to hold pump in operation, and the parts associated with said second chamber having a vent through which the pressure from the second chamber may be slowly reduced when the clapper is in the closed position.

3. A pressure control device, comprising a pressure system including a supply pipe, a valve connected with said pipe, a clapper movably mounted in said valve, a booster pump for increasing the pressure in said pipe, a regulator comprising a casing forming a pressure chamber, a connection between said chamber and said pipe above said valve, a movable member mounted in said pressure chamber, a rod secured to said movable member, a sleeve adjustably mounted upon the rod, a spring engaging the sleeve for moving the rod into a normal position against a predetermined low pressure in said chamber, means actuated by said rod for starting the pump when the rod is in the normal position and for stopping the pump when the rod is moved by pressure in said chamber upon the movable member against the action of the spring, said casing having a second chamber formed therein located upon the opposite side of the movable member from said first mentioned chamber, a second connection between said second chamber and said pipe controlled by said clapper adapted when the clapper is opened to admit pressure to the second chamber and equalize the pressures in said pressure chamber permitting the spring to hold the pump in operation, and said casing having a vent through which the pressure from said second chamber may be slowly reduced when the clapper is in the closed position.

4. A pressure control device, comprising a pressure system including a supply pipe, a valve connected with said pipe, a clapper movably mounted in said valve, a booster pump for increasing the pressure in said pipe, a regulator comprising a casing forming a pressure chamber, a connection between said chamber and said pipe above said valve, a movable member actuated by pressure in said chamber, a rod secured to said movable member, a sleeve adjustably mounted upon the rod, a spring engaging the sleeve for moving the rod into a normal position against a predetermined low pressure in said chamber, an electric switch actuated by said arm, a motor connected in an electric circuit including said switch for operating the pump, said casing having a second chamber formed therein located upon the opposite side of said movable member from said first mentioned chamber, a second connection between said second chamber and said pipe controlled by said clapper adapted when the clapper is opened to admit pressure to the second chamber and equalize the pressures in the opposite chambers permitting the spring to hold the pump in operation, and said casing having a vent through which the pressure from the second chamber may be slowly reduced when the clapper is in the closed position.

5. A pressure control device, comprising a pressure system including a supply pipe, a valve connected with said pipe, a booster pump for increasing the pressure in said pipe, a casing having a sealed chamber and a vented chamber formed in opposite ends thereof, connections forming communications between each chamber and said pipe, movable diaphragms forming a wall of each chamber, a rod secured between the diaphragms, means actuated by said rod for starting and stopping the pump, a spring tending to move the rod to a normal position against a predetermined low pressure in said pressure chamber to start the pump and yield to a predetermined high pressure in said last mentioned chamber for stopping the pump, a clapper in said valve adapted to open the connection between said pipe and said vented chamber for equalizing the pressures in said chambers permitting the spring to continue the pump in operation when the clapper is in the open position, and said clapper having a part for closing said connection communicating with the vented chamber when the clapper is in the closed position permitting the pressure in the pressure chamber to move the rod against the action of the spring and against the gradually diminishing pressure in the vented chamber to stop the pump after the clapper has closed.

In testimony whereof I affix my signature.

WILLIAM B. GRIFFITH.